(12) United States Patent
Bates

(10) Patent No.: US 6,994,933 B1
(45) Date of Patent: Feb. 7, 2006

(54) LONG LIFE THIN FILM BATTERY AND METHOD THEREFOR

(75) Inventor: John B. Bates, Oak Ridge, TN (US)

(73) Assignee: Oak Ridge Micro-Energy, Inc., Oak Ridge, TN (US)

( * ) Notice: Subject to any disclaimer, the term of this patent is extended or adjusted under 35 U.S.C. 154(b) by 300 days.

(21) Appl. No.: 10/244,260

(22) Filed: Sep. 16, 2002

(51) Int. Cl.
H01M 6/12 (2006.01)
H01M 6/46 (2006.01)
H01M 2/00 (2006.01)

(52) U.S. Cl. ............... 429/162; 429/163; 429/127; 429/124; 429/231.95

(58) Field of Classification Search ........... 429/162, 429/163, 127, 124, 231.95
See application file for complete search history.

(56) References Cited

U.S. PATENT DOCUMENTS

| | | | |
|---|---|---|---|
| 4,499,520 A | 2/1985 | Cichanowski | |
| 4,586,111 A | 4/1986 | Cichanowski | |
| 4,842,893 A | 6/1989 | Yializis et al. | |
| 4,954,371 A | 9/1990 | Yializis | |
| 5,260,095 A | 11/1993 | Affinito | |
| 5,338,625 A | 8/1994 | Bates et al. | |
| 5,440,446 A | 8/1995 | Shaw et al. | |
| 5,512,147 A | 4/1996 | Bates et al. | |
| 5,561,004 A | 10/1996 | Bates et al. | |
| 5,567,210 A | 10/1996 | Bates et al. | |
| 5,597,660 A | 1/1997 | Bates et al. | |
| 5,612,152 A | 3/1997 | Bates | |
| 5,725,909 A | 3/1998 | Shaw et al. | |
| 6,146,225 A | 11/2000 | Sheats et al. | |
| 6,168,884 B1 | 1/2001 | Neudecker et al. | |
| 6,242,132 B1 | 6/2001 | Neudecker et al. | |
| 6,268,695 B1 | 7/2001 | Affinito | |
| 6,270,841 B1 | 8/2001 | Mikhael et al. | |
| 6,365,300 B1 | 4/2002 | Ota et al. | |
| 6,387,563 B1 | 5/2002 | Bates | |
| 6,413,285 B1 | 7/2002 | Chu et al. | |
| 6,413,645 B1 * | 7/2002 | Graff et al. | ............ 428/446 |
| 2002/0071989 A1 | 6/2002 | Verma et al. | |

FOREIGN PATENT DOCUMENTS

JP    5922 6472 A2    12/1884

OTHER PUBLICATIONS

G. Nisato, P.C.P. et al. Evaluating High Performance Diffusion Barriers, The Calcium Test International Display Workshop, Oct. 2001.

(Continued)

*Primary Examiner*—Patrick Joseph Ryan
*Assistant Examiner*—Angela J. Martin
(74) *Attorney, Agent, or Firm*—Luedeka, Neely & Graham PC

(57) ABSTRACT

A thin film battery including an anode layer, a cathode layer and a solid electrolyte layer. The battery also includes, a planarization layer applied to the thin film battery. The planarization layer has a surface roughness of no more than about 1.0 nanometers root mean square and a flatness no larger than about 0.005 cm/inch. A barrier layer is applied to the planarization layer. The barrier layer is provided by one or more layers of material selected from the group consisting of polymeric materials, metals and ceramic materials. The planarization layer and barrier layer are sufficient to reduce oxygen flux through the barrier layer to the anode layer to no more than about 1.6 $\mu mol/m^2$-day, and $H_2O$ flux through the barrier layer to the anode layer to less than about 3.3 $\mu mol/m^2$-day thereby improving the life of the thin film battery.

21 Claims, 3 Drawing Sheets

OTHER PUBLICATIONS

J.D. Affinito et al. Polymer-Oxide Transparent Barrier Layers 1996 Society of Vacuum Coaters, 39th Annual Technical Conference Proceedings, Pacific Northwest national Laboratory, Richland, WA pp. 392-397.

John B. Bates et al. "Thin-Film Lithium Batteries" in *New Trends in Electrochemical Technology: Energy Storage Systems in Electronics*, edited by T. Osaha and M. Datta, Gordon and Breach, 2000 pp. 453-485.

* cited by examiner

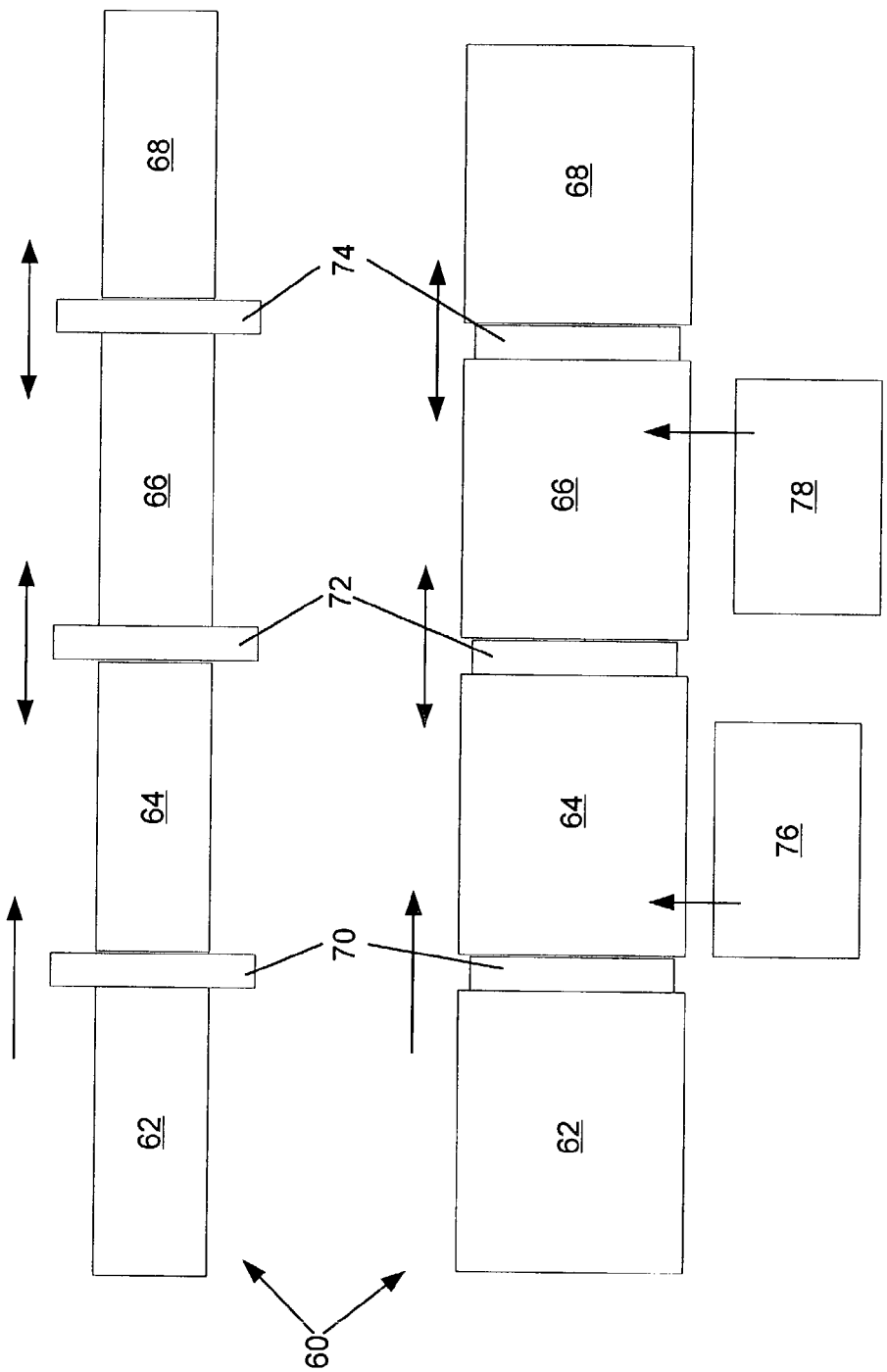

LONG LIFE THIN FILM BATTERY AND METHOD THEREFOR

The invention relates to thin film batteries and in particular to improved, long-life thin film batteries and methods for making long-life thin film batteries.

BACKGROUND OF THE INVENTION

Thin-film rechargeable batteries have numerous applications in the field of microelectronics. For example, thin-film batteries provide active or standby power for microelectronic devices and circuits. Active power sources of the thin-film battery type are used, for example, in implantable medical devices, remote sensors, miniature transmitters, smart cards, and MEMS devices. Standby power sources of the thin-film battery type are used, for example, in PCMCIA cards and other types of CMOS-SRAM memory devices.

In a thin-film battery, a chemical reaction takes place between an anode and cathode by interaction of the anode and cathode through an electrolyte. The attractiveness of thin-film batteries over conventional batteries is that the electrolyte is a substantially solid or non-flowable material rather than a liquid. Liquid electrolytes pose leakage problems and are often highly corrosive. Of the solid electrolytes, thin-film batteries typically employ ceramic electrolytes. Solid electrolytes are desirable in cells or batteries where liquid electrolytes may be undesirable, such as in implantable medical devices. Preferred solid electrolytes include materials that are solid at room temperature, electrically insulative and ionically conductive.

One of the challenges for thin film battery manufacturers is to provide a thin film battery that will have a life of up to 20 years. Such a life is particularly difficult to obtain with thin film batteries containing anode materials which are highly reactive with oxygen and/or water or water vapor. Various barrier materials have been applied to thin film batteries to reduce the reactivity of the anode materials toward oxygen and/or water or water vapor. However, such barrier materials have met with limited success.

As advances are made in microelectronic devices, new uses for thin-film batteries continue to emerge. Along with the new uses, there is a need for high performance thin-film batteries having improved life. In particular, there is a need for rechargeable thin film batteries that have a life approaching 20 years.

SUMMARY OF THE INVENTION

In one embodiment, with regard to the foregoing and other needs, the invention provides a method for improving the life of a thin film battery. The method includes providing a thin film battery having an anode layer reactive with oxygen and water vapor. A planarization material is applied over the anode layer and thin film battery to provide a relatively smooth, substantially pinhole free planarization layer. The surface roughness of the planarization layer is no more than about 1.0 nanometers root mean square, and the planarization material in the planarization layer is substantially non-reactive with the anode layer. One or more barrier layers are applied to the planarization layer. The barrier layers are selected from the group consisting of metal materials, ceramic materials, and polymeric materials. The planarization layer and the one or more barrier layers are effective to provide an oxygen flux through the planarization layer and one or more barrier layers of less than about 1.6 $\mu mol/m^2$-day.

In another embodiment the invention provides a long-life, thin film battery. The battery includes a support substrate having a support surface. A cathode current collector spaced-apart from an anode current collector is deposited on the support surface of the substrate. A cathode layer is deposited on a portion of the cathode current collector. A solid electrolyte layer is deposited on the cathode material, substrate and a first portion of the anode current collector. An anode layer is deposited on the electrolyte layer, and a second portion of the anode current collector to provide a thin film battery stack. A planarization material applied over the thin film battery stack to provide a relatively smooth planarization layer have a surface roughness of no more than about 1.0 nanometers root mean square. The planarization material in the planarization layer is substantially non-reactive with the anode layer. One or more barrier layers are applied over the planarization layer, the barrier layers being selected from the group consisting of metal materials, ceramic materials, and polymeric materials. The planarization layer and the one or more barrier layers are effective to provide an oxygen flux through the planarization layer and one or more barrier layers of less than about 1.6 $\mu mol/m^2$-day.

In yet another embodiment, the invention provides a thin film battery including an anode layer, a cathode layer and a solid electrolyte layer. The battery also includes, a planarization layer applied to the thin film battery. The planarization layer has a surface roughness of no more than about 1.0 nanometers root mean square and a flatness no larger than about 0.005 cm/inch. A barrier layer is applied to the planarization layer. The barrier layer is provided by one or more layers of material selected from the group consisting of polymeric materials, metals and ceramic materials. The planarization layer and barrier layer are sufficient to reduce oxygen flux through the barrier layer to the anode layer to no more than about 1.6 $\mu mol/m^2$-day, and $H_2O$ flux through the barrier layer to the anode layer to less than about 3.3 $\mu mol/m^2$-day.

An important advantage of the invention is that thin-film batteries containing the planarization layer and one or more barrier layers are expected to obtain a life approaching 20 years. Without wishing to be bound by theory, it is believed that a key component contributing to the increased life of the battery is the provision of a planarization layer on the thin film battery prior to depositing the one or more barrier layers on the battery. The planarization layer is preferably applied to the thin film battery so that it is relatively smooth and substantially planar. "Relatively smooth" means having a surface roughness of no more than about 1.0 nanometers root mean square (RMS) "Substantially planar" means having a flatness of no more than about 0.005 cm/inch, that is, the deviation in height per linear inch travel over the surface of the planarization layer is no more than about 0.005 cm.

BRIEF DESCRIPTION OF THE DRAWINGS

Further advantages of the invention will become apparent by reference to the detailed description when considered in conjunction with the figures, wherein like reference numbers indicate like elements throughout, and wherein:

FIG. 6 is a schematic side view of an apparatus for making improved thin film batteries according to the invention; and FIG. 7 is a schematic top view of the apparatus illustrated in FIG. 6.

DETAILED DESCRIPTION OF THE INVENTION

As set forth above, the invention provides an improved thin-film battery that is expected to have a life of up to about 20 years. The extended life expectancy is provided by a unique thin film battery construction technique. The technique is particularly applicable to extending the life of thin film batteries that contain an anode reactive with oxygen and/or water or water vapor, such as, for example, a lithium anode or lithium ion containing anode. It is well known that lithium is a highly reactive material. On exposure to moist or dry air, lithium can undergo the following reactions:

$$2Li + H_2O + \tfrac{1}{2}O_2 = 2LiOH \qquad (I)$$

$$2Li + \tfrac{1}{2}O_2 = Li_2O \qquad (II)$$

Thin film battery lifetime is determined by the time the capacity of the battery decreases to 80% of its rated value. In order to understand the requirements of a protective barrier coating to prevent reaction of the battery components, especially the anode, with oxygen or water on exposure to air, we consider the example of a thin film battery with a 1 cm$^2$×3 $\mu$m thick lithium metal anode. While the area of the battery and therefore the anode could have any value, a 3 $\mu$m thick lithium anode would be typical of thin film lithium batteries. For a theoretically dense lithium film, with a density of $\rho$=0.534 g/cm$^3$, the mass of lithium in the anode is 160 $\mu$g, and the number of moles of lithium, MW=6.941 g/mol, is 23.1 $\mu$mol. So, in order to lose no more than 20% of the capacity of the thin film battery due to reaction of the 1 cm$^2$×3 $\mu$m lithium metal anode with air, the amount of lithium reacted must be less than or equal to 32 $\mu$g or about 4.6 $\mu$mol. Therefore, over 20 years, the total amount of oxygen penetrating the protective barrier must be less than 1.2 $\mu$mol and the amount of water less than 2.3 $\mu$mol. Neglecting edge penetration, the flux of O$_2$ through the top of the protective coating over the battery must be less than 1.6 $\mu$mol/m$^2$-day and the flux of H$_2$O less than 3.3 $\mu$mol/m$^2$-day.

Figure 1:
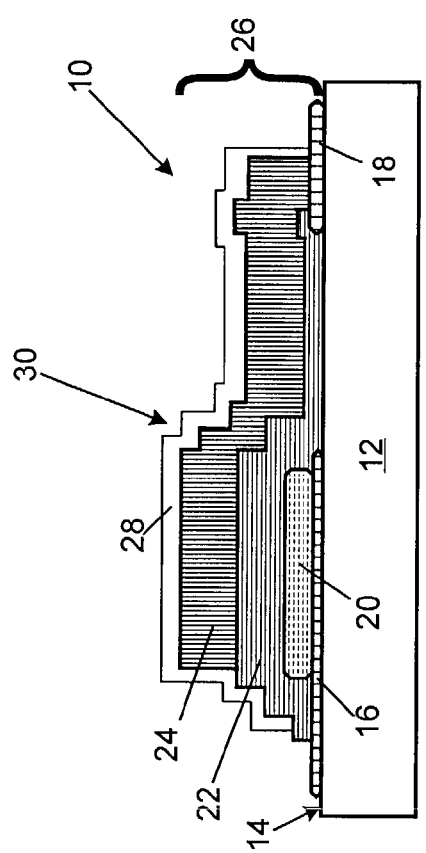
FIG. 1 is a cross-sectional view, not to scale, of a conventional thin-film battery.

Until now, providing a suitable protective coating on a thin film battery has been difficult. It is believed that much of the difficulty in providing a suitable protective barrier layer is due to the unevenness of the surface of the thin film battery. With reference to FIG. 1, a conventional thin film battery 10 is illustrated. The thin film battery 10 includes a support substrate 12 having a support surface 14, a cathode current collector 16 attached to the support surface 14 of the substrate 12, and an anode current collector 18 on the support surface 14 of the substrate in a spaced-apart location relative to the cathode current collector 16. A cathode 20 is deposited on a portion of the cathode current collector 18. A solid electrolyte 22 is deposited over the cathode 20, on a portion of the support surface 14 of the substrate 12 and on a portion of the anode current collector 18. Next, an anode 24 is deposited on the electrolyte 22 and a portion of the anode current collector 18. The components of the thin film battery are referred to herein as the thin film battery stack 26. For highly reactive anodes 24, it is preferred to provide a protective conformal coating 28 over the anodes 24. The thin film battery stack 26 has a maximum thickness of less than about 15 microns measured from the support surface 14 to the highest point of the battery stack 26 above the support surface 14.

The techniques for making thin film lithium, lithium-ion, and lithium-free lithium batteries, such as the battery 10 is described, for example, in the U.S. Pat. No. 5,567,210 to Bates et al., U.S. Pat. No. 5,612,152 to Bates, U.S. Pat. No. 6,168,884 to Neudecker et al., U.S. Pat. No. 6,242,132 to Neudecker et al. and the scientific literature. The construction as illustrated in FIG. 1 is such that the uppermost active layer is the anode 24. For the purposes of this invention, designation of the battery construction will begin with the anode 24 and proceed upward to the uppermost layer of the barrier coating. It is understood that the construction from the battery 10 from the anode 24 to the substrate 12 is the same as illustrated in FIG. 1 and described in the patent and scientific literature. The foregoing patents are incorporated by reference as if fully set forth herein.

As seen in FIG. 1, the battery stack 26 is relatively non-planar. That is, there is a "stair-step" configuration of the upper surface 30, caused by overlapping the layers of the thin film battery 10. Accordingly, the conformal coating 28 applied to the battery stack 26 also provides a non-planar upper surface 30 of the battery. One such conformal coating is described, for example, in U.S. Pat. No. 5,561,004 to Bates et al. Experiments have shown that a coating 28 consisting of alternating layers of parylene and metal films provides protection for no longer than about three months even though the total thickness of the multilayer coating ranges from about 5 to about 10 $\mu$m. During this period of time, sufficient oxygen and water diffuse through the coating 28 so that essentially all of the lithium in a lithium anode 24 is converted to lithium oxide and/or lithium hydroxide.

It is believed that the failure of a parylene-metal multilayer coating 28 is due to the conformal nature of parylene and to the presence of pin holes in the coating 28. Asperities or pits on the surface of the anode 24 are replicated by a first parylene layer, so that a following metal layer does not uniformly coat the surface of the parylene. Since the metal films are deposited by sputtering or evaporation which are line of sight processes, the asperities shadow regions of the anode 24 from the metal coating, and possibly some regions near asperities receive little or no metal coating at all. Parylene by itself provides little protection because the transmission rates of oxygen and water through this material are too high to protect the anode from oxygen and/or water or water vapor.

Figure 2:
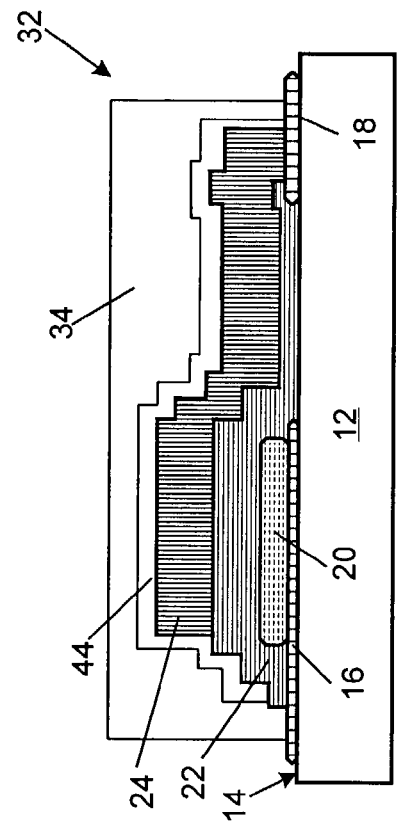
FIG. 2 is a cross-sectional view, not to scale, of a thin-film battery containing a planarization/barrier layer according to the invention.

The present invention solves the problem of pin holes and asperities by first "planarizing" the battery surface 30 with a polymeric film that forms a planarization layer over the thin film battery stack 26. The planarization layer is formed by flash evaporating a monomer or oligomer such as a high molecular weight acrylate and then polymerizing the monomer film by cross linking using ultra violet (UV) or electron beam (EB) irradiation. The planarization layer is combined with additional barrier layer materials selected from metal, ceramic, and/or polymeric materials to provide a composite planarization/barrier layer 34 as illustrated in FIG. 2.

The monomer or oligomer deposit providing the planarization layer spreads out evenly over the surface of the battery and substrate to a depth that completely covers the asperities and other rough surface features. After cross-linking, a smooth, flat layer remains so that subsequent layers of metal or ceramic films are deposited onto a smooth, flat surface. This avoids any shadowing effects and minimizes the formation of pin holes during the deposition processes. In addition to vacuum deposition, the planarization layer can be deposited by spray or dip coating as described generally in U.S. Pat. No. 5,725,909 to Shaw et al., the disclosure of which is incorporated by reference thereto as if fully set forth herein, or by spin coating a monomer or oligomer followed by a UV cure. An important feature of the invention is the provision of a planarizing layer followed by one or more additional barrier layers to provide a relatively smooth and substantially planar planarization layer/barrier layer composite 34 that is substantially pin hole free.

A relatively smooth composite layer 34 preferably has a surface roughness of no more than about 1.0 nanometers (nm) root mean square (RMS), and preferably from about 0.1 to about 1.0 nm RMS. A substantially planar composite 34 preferably has a flatness of no greater than 0.005 cm/inch. In other words, for each inch of travel across the surface of the composite 34, the deviation in height of the surface of the composite 34 is no more than about 0.005 centimeters.

The techniques for vacuum deposition of monomers suitable for providing the planarization layer followed by cross linking using UV or EB irradiation were developed for making capacitors, for example as described in U.S. Pat. No. 4,842,893 to Yializis, et. al., U.S. Pat. No. 4,954,371 to Yializis, and U.S. Pat. No. 5,440,446 to Shaw, et. al., the disclosures of which are incorporated by reference as if fully set forth herein. It is particularly preferred to degas the monomer prior to the flash evaporation step of the process. The advantages of forming a polymeric planarization layer before depositing one or more barrier layer materials include improved surface properties and bonding of subsequent layers (e.g. ceramic or metal), faster curing, fewer impurities, and higher density.

The preferred monomers are polyfunctional acrylates with number average molecular weights ranging from about 150 to about 1000 $MW_N$, preferably ranging from about 200 to about 300 $MW_N$. Such monomers are set forth, for example in U.S. Pat. No. 4,842,893 to Yializis, et al.

There are a large number of acrylate monomers and oligomers that may be used in accordance with the invention for providing a relatively smooth, and substantially planar planarization layer. The preferred monomers are hydrophobic and substantially non-reactive with the anode material of the thin film battery. Particularly preferred monomers are polyfunctional acrylates with number average molecular weights ranging from about 150 to about 5000 $MW_N$, preferably ranging from about 200 to about 300 $MW_N$. Such monomers are set forth, for example in U.S. Pat. No. 4,842,893 to Yializis, et al. and U.S. Pat. No. 4,499,520 to Cichanowski. Monomers that are commercially available from Sartomer of Exton, Pa. include, but are not limited to: lauryl acrylate sold under the trade name SR 335, 2-phenoxyethyl acrylate sold under the trade name SR 339, isodecyl acrylate sold under the trade name SR 395, isooctyl acrylate sold under the trade name SR 440, tridecyl acrylate sold under the trade name SR 489, isobornyl acrylate sold under the trade name SR 506, 1,3-butylene glycol diacrylate sold under the trade name SR 212, 1,6-hexanediol diacrylate sold under the trade name SR 238, ethoxylated bisphenol-A diacrylate sold under the trade name SR 349, propoxylated neopentyl glycol diacrylate sold under the trade name SR 9003, tris(2-hydroxyethyl) isocyanurate triacrylate sold under the trade name SR 368, and trimethylopropane triacrylate sold under the trade name SR 351.

In general, any of the monomer or oligomer acrylates, diacrylates, or triacrylates that do not contain an acid group, i.e.—COOH, are suitable for providing the planarization layer. Other polymeric materials may also be used for the planarization layer. For example, film forming polyolefins, such as polyethylene and polypropylene monomers deposited by plasma polymerization may also be used.

For deposition of the planarization layer by spraying, dip coating, or spin coating, hydrophobic oligomers such as polybutadiene dimethacrylate and polybutadiene urethane diacrylate are preferred because of their chemical and water resistance. The foregoing oligomers may also be vapor deposited as well and cross-linked using UV radiation or EB curing.

After formation of the planarization layer by vacuum deposition, spray or dip coating of a monomer or oligomer followed by polymerization using UV radiation, EB curing, or thermal curing, any number of different combinations of ceramic, metal, and additional polymeric layers may be deposited on the relatively smooth planarization layer in order to provide a barrier layer for protecting the thin film battery. Examples of ceramic and metal films suitable for providing the one or more barrier layers is provided, for example, in U.S. Pat. No. 6,413,645 to Graff et al., the disclosure of which is incorporated by reference as if fully set forth herein.

Figure 5:
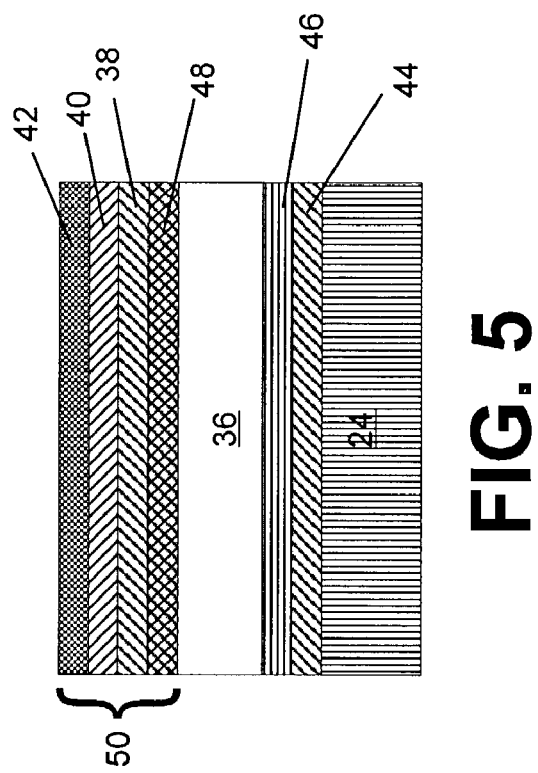
FIGS. 3–5 are cross-sectional views, not to scale of planarization/barrier layers according to the invention.
Figure 3:
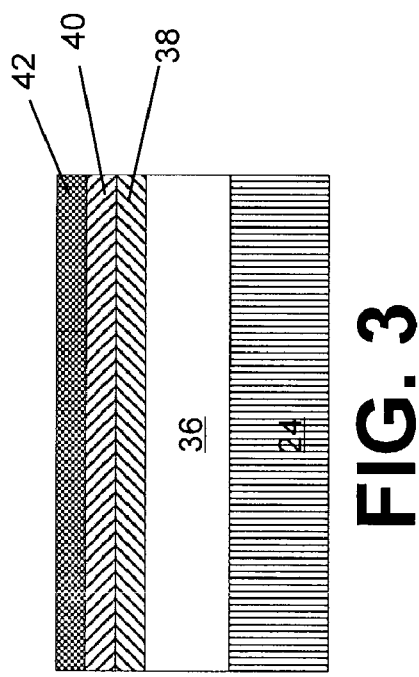
Figure 4:
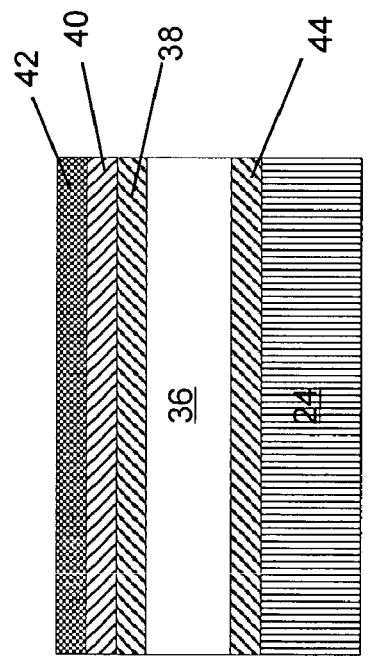

Planarization and barrier layer composites for thin film batteries are illustrated for, example, in FIGS. 3–5. With reference to FIG. 2, a composite planarization layer/barrier layer 34 for a thin film battery 32 is provided. With reference to FIGS. 3–5, the planarization layer 36 is provided by a monomer or oligomer as described above. The thickness of the planarization layer 36 preferably ranges from about 1 to about 5 microns. Next, a metal layer 38, ceramic layer 40, and/or polymeric layer 42 is applied to the planarization layer 36 to provide one or more barrier layers. The thickness of each of the one or more barrier layers 38, 40, and 42 preferably ranges from about 20 nanometers to about 1 micron.

Ceramic materials useful for forming a ceramic barrier layer include, but are not limited to, metal oxides, metal nitrides, metal carbides, metal oxynitrides, and the like, such as $Al_2O_3$, AlN, $In_2O_3$, $SiO_2$, $Si_3N_4$, SiC, silicon oxynitride, $SnO_2$, indium tin oxide, $TiO_2$ and $ZrO_2$. Metal materials useful for forming a metal barrier layer include, but are not limited to, Al, Ta, Ti, and W. Polymeric materials useful for forming a polymeric barrier layer include, but are not limited to, the materials used for providing the planarization layer 36.

As set forth above, the planarization layer 36 may be deposited directly on the anode layer 24 (FIG. 3). Next a metal layer 38 is deposited on the planarization layer 36. A ceramic layer 40 is deposited on the metal layer, and a polymeric layer 42 is deposited on the ceramic layer. If desired, additional ceramic, metal, and/or polymeric layers may be deposited on the polymeric layer 42 to provide the composite planarization layer/barrier layer on the thin film battery. The order, selection, and number of barrier layer materials deposited on the planarization layer 36 is not critical to the invention, provided a relatively smooth planarization layer 36, as set forth above, is provided over the thin film battery stack.

In another embodiment, illustrated in FIG. 4, a copper or other metal that does not alloy to any significant extent with the anode layer 24 such as V, Cr, Ni, Ti, or W is deposited as a protective layer 44 over the anode layer and a portion of the anode current collector 18. The protective layer 44 provides temporary protection for the anode 24 and also improves the electrical contact between the anode 24 and the anode current collector 18. The planarization layer 36 is deposited on the protective layer 44 next followed by alternating layers of metal, layer 38, and/or ceramic, layer 40, and/or polymer, layer 42.

In yet another embodiment, illustrated in FIG. 5, a layer 46 of the electrolyte material, for example, lithium phosphorus oxynitride ("LIPON"), is deposited over the protective layer 44 before the planarization layer is deposited on the thin film battery stack 36. A sacrificial or getter layer 48 of magnesium may also is deposited in a barrier layer stack 50 close to the planarization layer 36 in order to trap oxygen or water that has diffused through the barrier layer stack 50. The thickness of the getter layer 48 preferably ranges from about 10 nm to about 100 nm. Magnesium will react with $O_2$ to form MgO or with $O_2$ and $H_2O$ to form $Mg(OH)_2$.

Various composite planarization layer/barrier layer composites according to the invention, may include, but are not limited to:

P/C/M/PL/anode;
P/M/C/PL/Cu/anode;
P/C/M/C/Mg/PL/Cu/anode;
P/M/C/Mg/PL/LIPON/Cu/anode wherein P is a polymeric material, M is a metal material, C is a ceramic material, and PL is a planarization layer.

Unlike the use of barrier coating materials for light emitting diodes (OLEDs), or dielectric layers for multi-layer capacitors, the choice of barrier coating materials for thin film batteries according to the invention is not so limited. In the case of multilayer capacitors, the dielectric constant of the dielectric layer is of concern, while in the case of OLEDs, the barrier layers must be transparent. The barrier coating materials selected for thin film battery barrier layers serve only to limit the amount of oxygen and/or water vapor that reaches the anode and other battery components, and therefore the dielectric or optical properties of the barrier coating films are unimportant.

Schematic diagrams of an apparatus 60 for applying the planarization layer 36, barrier layers 38, 40, and 42, and getter layer coating materials to a thin film battery are illustrated in FIGS. 6–7. FIG. 6 is a schematic side view of the apparatus 60 and FIG. 7 is a schematic top plan view of the apparatus 60. The vacuum deposition chamber 62 for depositing the anode layer, planarization or polymer layer chamber 64, and metal and/or ceramic layers chamber 66 and 68 are isolated from one another by gate valves 70, 72, and 74 so that each chamber can be isolated from adjacent chamber(s). This arrangement of vacuum chambers 62, 64, 66, and 68 and gate valves 70, 72, and 74 is referred to as an in-line deposition system.

After depositing the anode 24 in chamber 62 by evaporation or sputtering, the thin film battery is transferred into the polymer coating chamber 64 for depositing the planarization layer 36 on the anode 24. As described above, the planarization layer 36 is preferably deposited by flash evaporation of a monomer or oligomer followed by a UV or EB cure to polymerize the film. If the anodes 24 are deposited in separate system, they are placed in an anode load chamber 76 for transfer into the polymer coating chamber 64.

After depositing and curing the planarization layer 36 in chamber 64, the battery is moved into chamber 66 for deposition of a metal layer 38 or ceramic layer 40 and then into chamber 68 for depositing a second metal layer 38 or ceramic layer 40. Each of the metal or ceramic layers are preferably deposited by sputtering, evaporation, or plasma enhanced chemical vapor deposition. The arrows indicate that the battery may be moved back and forth through chamber 64 and the two metal and/or ceramic coating chambers 66 and 68 as many times as necessary to obtain a multilayer coating with the desired barrier properties. Alternatively, the planarization layer 36 can be applied by spin coating, dip coating, or spraying in chamber 78 followed by UV cure. The battery with the planarization layer 36 is then loaded from chamber 78 into the metal/ceramic coating chambers 66 and 68 for applying one or more ceramic and/or metal layers to the planarization layer 36.

The invention described above is also applicable to improved litihium or lithium-ion thin film batteries containing solid doped electrolytes. A particularly preferred doped electrolyte for a lithium or lithium ion battery incorporates a sulfide ion. The electrolyte is preferably a solid amorphous composition represented by the following formula:

where $2x+3y+2z=5+w$, x ranges from about 3.2 to about 3.8, y ranges from about 0.13 to about 0.46, z ranges from greater than zero up to about 0.2, and w ranges from about 2.9 to about 3.3. Compositions of the foregoing formula, preferably contain from about 37.4 to about 39.7 atomic percent lithium ion, from about 11.8 to about 13.1 atomic percent phosphorus ion and from about 41.7 to about 45.4 atomic percent oxygen ion in addition to the sulfide ion and nitrogen ion. Examples of electrolyte compositions of the invention having the preferred S/P ratios are given in the following table:

| Li ion (atomic %) | P ion (atomic %) | Oxygen ion (atomic %) | Nitrogen ion (atomic %) | Sulfide ion (atomic %) |
|---|---|---|---|---|
| 39.43 | 11.95 | 45.40 | 2.03 | 1.19 |
| 39.66 | 12.02 | 44.47 | 2.64 | 1.20 |
| 37.81 | 13.04 | 43.02 | 4.82 | 1.30 |
| 37.86 | 13.05 | 41.78 | 6.01 | 1.31 |
| 39.36 | 11.93 | 45.33 | 1.59 | 1.79 |
| 37.74 | 13.02 | 42.95 | 4.34 | 1.95 |
| 38.94 | 11.80 | 44.90 | 2.60 | 1.77 |
| 37.40 | 12.89 | 41.84 | 5.93 | 1.93 |

Electrolytes of the foregoing composition may be used in thin-film batteries having oxide-based cathodes, such as $LiCoO_2$ and $LiMn_2O_4$, that operate at potentials above 3.8 volts.

Having described various aspects and embodiments of the invention and several advantages thereof, it will be recognized by those of ordinary skills that the invention is susceptible to various modifications, substitutions and revisions within the spirit and scope of the appended claims.

What is claimed is:

1. A method for improving the life of a thin film rechargeable battery having a solid electrolyte comprising the steps of:

providing a thin film battery having an anode layer reactive with oxygen and water vapor;

applying a planarization material over the anode layer and thin film battery to provide a relatively smooth, substantially pinhole free planarization layer, wherein the surface roughness of the planarization layer is no more than about 1.0 nanometers root mean square, and the planarization material in the planarization layer is substantially non-reactive with the anode layer; and applying one or more barrier layers to the planarization layer, the barrier layers being selected from the group consisting of metal materials, ceramic materials, and polymeric materials; whereby the planarization layer and the one or more barrier layers are effective to provide a thin film battery having an extended life.

2. The method of claim 1 wherein the thin film battery comprises a lithium or lithium ion containing anode.

3. The method of claim 1 wherein the planarization material is selected from the group consisting of acrylates, diacrylates, triacrylates, and polyolefins that do not contain an organic acid group thereon.

4. The method of claim 1 wherein the planarization layer has a flatness no greater than about 0.005 cm/in.

5. The method of claim 1 further comprising applying a metal layer to the anode layer prior to applying the planarization material to the anode layer and thin film battery, wherein the metal layer is provided by a metal that does not significantly alloy with the anode layer.

6. The method of claim 5 further comprising depositing a layer of lithium phosphorus oxynitride on the metal layer prior to applying the planarization material to the anode layer and thin film battery.

7. The method of claim 6 further comprising depositing magnesium over the planarization layer to provide a getter layer reactive with oxygen and $H_2O$.

8. The method of claim 1 further comprising depositing magnesium over the planarization layer to provide a getter layer reactive with oxygen and $H_2O$.

9. A long-life, thin film rechargeable battery, comprising:
a support substrate having a support surface;
a cathode current collector spaced-apart from an anode current collector deposited on the support surface of the substrate;
a cathode layer deposited on a portion of the cathode current collector;
a solid electrolyte layer deposited on the cathode material, substrate and a first portion of the anode current collector;
an anode layer deposited on the electrolyte layer, and a second portion of the anode current collector to provide a thin film battery stack;
a planarization material applied over the thin film battery stack to provide a relatively smooth planarization layer having a surface roughness of no more than about 1.0 nanometers root mean square, and the planarization material in the planarization layer is substantially non-reactive with the anode layer;
one or more barrier layers applied over the planarization layer, the barrier layers being selected from the group consisting of metal materials, ceramic materials, and polymeric materials; whereby the planarization layer and the one or more barrier layers are effective to provide a thin film battery having an extended life.

10. The long-life, thin film battery of claim 9 wherein the anode layer comprises lithium or a lithium ion containing material.

11. The long-life, thin film battery of claim 9 wherein the planarization material is selected from the group consisting of acrylates, diacrylates, triacrylates, and polyolefins that do not contain an organic acid group thereon.

12. The long-life, thin film battery of claim 9 wherein the planarization layer has a flatness no greater than about 0.005 cm/in.

13. The long-life, thin film battery of claim 9 further comprising a metal layer deposited on the anode layer between the anode layer and the planarization layer, wherein the metal layer is provided by a metal that does not significantly alloy with the anode layer.

14. The long-life, thin film battery of claim 13 further comprising a layer of lithium phosphorus oxynitride deposited on the metal layer between the planarization layer and the metal layer.

15. The long-life, thin film battery of claim 9 further comprising a magnesium layer deposited on the planarization layer to provide a getter layer reactive with oxygen and $H_2O$.

16. A thin film rechargeable battery including an anode layer, a cathode layer and a solid electrolyte layer, the improvement comprising:
a planarization layer applied to the thin film battery, the planarization layer having a surface roughness of no more than about 1.0 nanometers root mean square and a flatness no greater than about 0.005 cm/inch; and
a barrier layer applied to the planarization layer, wherein the planarization layer and barrier layer are sufficient to reduce oxygen flux through the barrier layer to the anode layer, and $H_2O$ flux through the barrier layer to the anode layer to provide a thin film battery having an extended life wherein the barrier layer is provided by one or more layers of material selected from the group consisting of polymeric materials, metals and ceramic materials.

17. The thin film battery of claim 16 wherein the planarization layer is selected from the group consisting of acrylates, diacrylates, triacrylates, and polyolefins that do not contain an organic acid group thereon.

18. The thin film battery of claim 16 further comprising a metal layer deposited on the anode layer between the anode layer and the planarization layer, wherein the metal layer is provided by a metal that does not significantly alloy with the anode layer.

19. The thin film battery of claim 18 further comprising a layer of lithium phosphorus oxynitride deposited on the metal layer between the planarization layer and the metal layer.

20. The thin film battery of claim 16 further comprising a magnesium layer deposited on the planarization layer to provide a getter layer reactive with oxygen and $H_2O$.

21. The thin film battery of claim 16 wherein the solid electrolyte layer comprises a lithium phosphorus oxynitride material containing a sulfide ion dopant wherein the atomic ratio of sulfide ion to phosphorus ion (S/P) in the electrolyte ranges from greater than 0 up to about 0.2 and wherein the composition is represented by the formula:

$$Li_wPO_xN_yS_z,$$

where $2x+3y+2z=5+w$, x ranges from about 3.2 to about 3.8, y ranges from about 0.13 to about 0.46, z ranges from greater than zero up to about 0.2, and w ranges from about 2.9 to about 3.3.

* * * * *